Aug. 6, 1957 R. P. BONN 2,802,153
PRESS CONTROL
Filed Feb. 8, 1954 2 Sheets-Sheet 1

INVENTOR
Robert P. Bonn.
BY
Paul E. Friedemann
ATTORNEY

United States Patent Office 2,802,153
Patented Aug. 6, 1957

2,802,153

PRESS CONTROL

Robert P. Bonn, Williamsville, N. Y., assignor to Westinghouse Electric Corporation, East Pittsburgh, Pa., a corporation of Pennsylvania Application February 8, 1954, Serial No. 408,819

5 Claims. (Cl. 317—123)

My invention relates to an electric system of control, and more particularly to a system of control for a prime mover coupled to a cyclically moving machine such, for example, as a power press.

Stated somewhat less broadly, my invention relates to control systems for machines, as power presses, which are operatively coupled, when operation is desired, to a continuously rotating prime mover. Such machines are, through suitable controlled clutching means, coupled to the prime mover, engine, or electric motor, to start and operate them for a selected rotation and are then decoupled from the prime mover, and are, through suitable braking means brought to a stop. In this disclosure, reference hereinafter will be to an electric motor, but such designation includes another type of motor means.

Control systems of the general type above mentioned are well known in the art, but still do not provide the maximum in safety to the operators, are still rather complicated and expensive, and do not provide the unfailing reliable operation demanded by the hazards of the operation of the machines involved.

One broad object of my invention is the provision of an improved system of control for effecting the operation of the clutch for coupling a press, or similar machine, to a continuously rotating electric motor and for decoupling the machine from the motor.

It is a more specific object of my invention to provide a system of control for a press, or similar machine, which prevents, in an improved manner, accidental unintended starting of the press from rest, and accidental unintended continuous operation of the press.

The objects stated are merely illustrative. Other objects and advantages will become more apparent from a study of the following specification and the accompanying drawings, in which.

Figure 1:
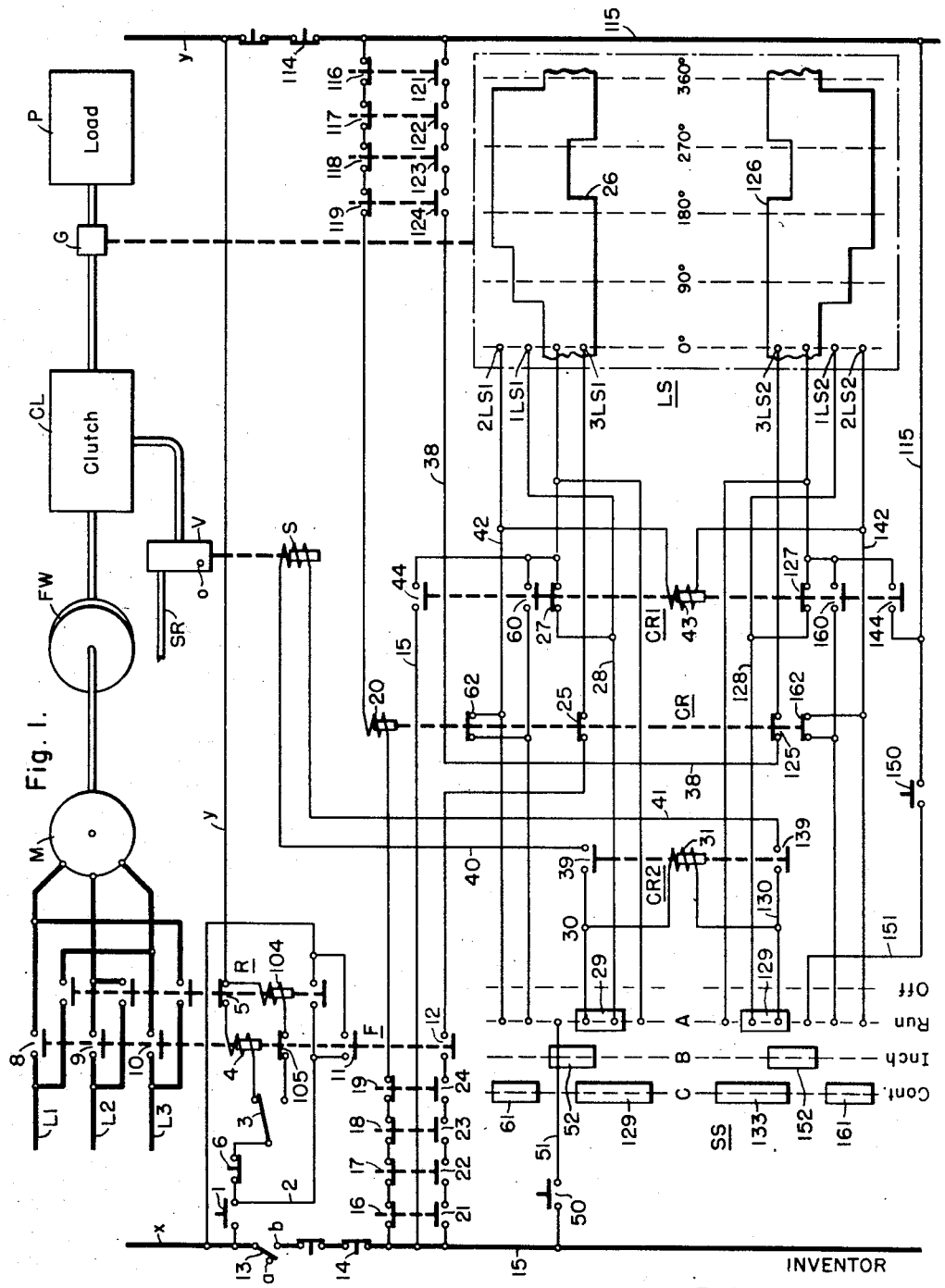
Figure 1 is a diagrammatic showing of one embodiment of my invention.

In the drawings, P represents the load, namely a press, the operation of which is to be controlled. A limit switch mechanism LS is, through suitable transmission gears G, so coupled to the press that the limit switch mechanisms make one complete rotation of 360° for each cycle of operation of the press.

A clutch CL, which may be actuated either hydraulically or pneumatically and, when properly actuated in one sense, couples the press and limit switch mechanisms LS to the motor M and, when actuated in another sense, decouples these machines from the motor M. A heavy flywheel FW is rigidly and for the purposes of this invention permanently coupled to the motor shaft. The flywheel thus helps carry the load, which is extremely variable during each cycle.

The actuating fluid for the clutch CL is received from a suitable high pressure supply reservoir, here designated merely by the pipe SR. The actuating fluid, when the clutch is to couple the press to the motor, passes through the valve mechanism V to the clutch CL. This occurs when the valve actuating solenoid S is energized. When the solenoid is deenergized the actuating fluid exhausts through port $o$, and the press is decoupled from the load and suitable braking mechanisms bring the press to a stop. Since the brake mechanisms do not constitute part of my invention, these mechanisms are not shown.

If a more detailed understanding is desired of how the clutch and brake mechanism operate, reference may be had to the U. S. Letters Patent No. 2,299,007.

To better understand my invention, I shall explain the elements and their function in conjunction with the press operation. A few brief preliminary remarks may, however, be most helpful.

In press operation, it is imperative that the lubricating system be in operation, the compressor mechanisms be in operation, and the die holding slides are in proper position before any press operation is attempted. To this end, switch 14 must be in the $a$ position to effect such operation. The system is such that after the compressor works, the slides are positioned, and the lubricating pumps work switch 13 can be moved to the $b$ position.

To effect operation of the press, the motor M must first be started. This is accomplished by depressing switch 1, whereupon a circuit is established from conductor $x$ through switch 1, conductor 2, stop switch 6, switch 3, the actuating coil 4 of the forward contactor F, the back on normally closed contacts 5 of the reverse contactor R, to conductor $y$. Operation of contactor F closes the contacts 8, 9, 10, 11, and 12 and opens the contacts 105 in the circuit of the actuating coil 104 of the reverse contactor R. The closure of contacts 11 provides a holding circuit for contactor F, because these contacts shunt the switch 1. The closure of contacts 12 makes it possible to energize certain parts of the rest of the control. This will become more apparent presently.

The switch 13 may now be moved to the $b$ position. When this is done, conductor 15 is connected to conductor $x$ through the switches 13, 14 and 114.

The foregoing subject matter is substantially the same as is included in the copending case of Robert P. Bonn and Robert W. Egglestone, Serial No. 408,924, filed February 8, 1954, and entitled "Pressure Control." The present application, in effect, embodies modifications of the control disclosed and claimed in the copending case.

After conductors 15 and 115 are energized and the selector switch SS is positioned in the A position for single stroke operation, a circuit is established from conductor 15 through the normally closed or back contacts 16, 17, 18 and 19 of the operators push-button switches, the actuating coil 20 of the control relay CR, the back contacts 119, 118, 117 and 116 of the operators push-button switches to the energized conductor 115. The number of push buttons herein shown is for four attendants, one switch for each hand of each attendant. Some presses require more attendants, in which case more push-button switches are used so that each attendant will be in the safe position while operation of the press is being effected.

Energization of the actuating coil 20 causes the operation of the control relay CR which thereupon opens its normally closed contacts 25 and 125 and 62 and 162. No further circuits are established until all of the attendants press their push buttons to close the normally open or make contacts on the push buttons. When this takes place, a circuit is established from the conductor 15 through normally open contacts 21, 22, 23 and 24 of the push buttons, normally open contacts 12 of the forward contactor, normally closed contact 25 of the control relay CR which will, of course, drop out and close this contact, the limit switch 3LS1, bridged by segment 26, normally closed contacts 27 of the control relay CR1, conductor 28, segment 29 of the selector switch SS, conductor 30, actuating coil 31 of the control relay CR2, conductor 130, segment 129 of the selector switch SS, conductor 128, normally closed contacts 127, segment 126, limit switch 3LS2, normally closed contacts 125 of the control relay CR, conductor 38, and the normally open or make contacts 124, 123, 122, 121 of the operators push buttons. Since conductors 30 and 130 are energized by the circuit traced, it is apparent that when control relay CR2 closes the contacts 39 and 139, a circuit is established from energized conductor 30 through contacts 39, conductor 40, solenoid S of the electromagnetic valve V, conductor 41, normally open contact 139 to the energized conductor 130.

With the energization of the solenoid S, the valve V is actuated to cause high pressure fluid to flow from SR through valve V to the clutch CL. The clutch couples the press P to the motor, and the press begins its cycle of operation; namely, begins its down stroke. It will be noted that the limit switch mechanism LS is mechanically coupled to the press through the transmission gears G. The coupling is such that the limit switch mechanism 16 completes one rotation of 360° for each complete cycle of the press operation. For the development shown, the limit switch mechanism will first be in the position shown and then the segments will move from right to left to the 360° press position, that is, back to the initial position.

After the limit switch mechanism has moved about 60°, the limit switches 1LS1 and 1LS2 are connected to the energized segments 26 and 126. This means that the conductors 28 and 128 are now energized independent of the position of normally closed contacts 27 and 127. In other words, operation of relay CR1 would not affect the energization of the solenoid S operating the valve. This eliminates the necessity that the contacts 27 and 44, and 127 and 144 must overlap. After about 130° to 145° of movement of the limit switch mechanism, the limit switch contacts 2LS1 and 2LS2 close, whereupon a circuit is established from the energized segment 26 through limit switch 2LS1, conductor 42, actuating coil 43 of the control relay CR1, conductor 142, limiting switch 2LS2 to the energized segment 126.

As soon as control relay CR1 operates, a circuit is established from the energized conductor 15 through the normally open contacts 44 of control relay CR1, the upper terminal of limit switch 3LS1, to the energized segment 26, and the conductor 115 is similarly connected to segment 126 through normally open contacts 144 and lower contact of limit switch 3LS2. Since normally open contacts 44 shunt all of the normally open or make contacts of the operators push buttons at the left, and contacts 144 shunt all the normally open or make contacts of the operators push buttons at the right, it is apparent that the operators may now release their push buttons, and the cycle of operation will continue independent of any operations the attendant may wish to make, except operation of the emergency stop switches 14 and 114.

I have provided a very valuable safety feature with this circuitry to check for the proper operation of the control relay CR1. At about 220° of movement of the limit switch mechanism, the lower terminal of the limit switch 3LS1 does not engage segment 26, and the upper terminal of the limit switch 3LS2 does not engage segment 126. This means that if the relay CR1 has not operated, the energizing circuit for the solenoid S is opened and the press stops.

However, if the control relay CR1 operates, which will normally be the case, to close the normally open contacts 44 and 144, the opening of the limit switches 3LS1 and 3LS2 will not stop the operation. Since the continued operation of the valve V depends upon relay CR1, it is apparent that as soon as the segments 126 and 26 have moved to their 360° position, the circuit for control relay CR1 is opened, and since the limit switches 1LS1, 1LS2 and 2LS1 and 2LS2 are opened, the circuit to the solenoid S is opened. The relay CR1 then drops out to open its normally open contacts 44, 60, 160 and 144 and to then close its normally closed contacts 27 and 127.

If for any reason an operator maintains any one of the push buttons engaged, a new cycle of operation will not be effected because control relay CR1 remains picked up to hold contacts 27 and 127 open, and limit switches 1LS1, 2LS1, 1LS2 and 2LS2 are open. This follows from the fact that contacts 62 and 162 of relay CR remain closed. The energizing circuit for relay CR1 includes these contacts beginning at conductor 15 and comprising contacts 44, contacts 60, contacts 62, coil 43 of relay CR1, contacts 162, contacts 160, and contacts 144 to conductor 115. However, as soon as the operators release all of the push buttons, control relay CR picks up and the cycle of operation may thereafter be repeated.

From the foregoing discussion and a study of the circuits, I show it is apparent that malfunctioning of relays CR and CR1, which are the central features of my anti-repeat control, cannot cause the press to repeat. This novel functioning of my control can be readily tested by producing hypothetical failures of these relays CR and CR1. For example:

First: Assume relay CR fails to pick up when all push buttons are released, the press can be operated for one stroke when the buttons are again depressed. However, at the end of the stroke, the normally closed contacts 62 and 162 will cause relay CR1 to remain energized through the circuit previously traced. Contacts 27 and 127 of relay CR1 will then be open, and since limit switches 1LS1, 2LS1, 1LS2, and 2LS2 are open, the press cannot be restarted with the selector switch SS in the Run position.

Second: Assume relay CR sticks closed, such that its contacts 25 and 125 remain open when the buttons are depressed, the press again cannot be operated with the selector switch in the Run or Continuous position because contacts 25 and 125 form part of an energizing circuit for coil 31 of relay CR2 including the normally open push button contacts. CR2 controls solenoid S.

Third: Assume relay CR1 fails to pick up, then the press will stop when the limit switches open. The dependence of the anti-repeat control is checked by limit switches 3LS1 and 3LS2, whose operation and purpose have already been noted.

Fourth: Should relay CR1 fail to drop out at the end of the stroke, its contacts 27 and 127 will remain open and the press cannot be restarted because 27 and 127 also form part of an energizing circuit for coil 31 of relay CR2.

The control is thus anti-repeat except for positive action on the part of the attendant; namely, all of the attendants releasing all the switches.

When my control is to be used for inching purposes, the switch SS is moved to the B or Inch position. In this case, a circuit is established from conductors 15 through the inching switch 50, conductor 51, segment 52 to the conductor 30, and a similar circuit is established from the conductor 115 through the inching push button 150, conductor 151 and segment 152 to conductor 130, conductors 30 and 130 being energized, the control relay CR2 thus operates to close contacts 39 and 139, and the solenoid S is energized but remains energized only as long as the push-button switches 50 and 150 are maintained in closed position.

If continuous operation, sometimes referred to as the unsafe operation, is to be effected, the selector switch is moved to the C position. For continuous operation, the limit switch operation and contact operation shown is exactly the same as for single cycle operation up to and until control relay CR1 operates. When this relay CR1 operates, it closes the contacts 60 to thus establish a circuit from the conductor 15 through the contacts 44 and 60, selector switch segment 61 to conductor 42 to energize the segment 26. A similar circuit is established from conductor 115 through contacts 144 and 160 through segment 161 of the selector switch SS to conductor 142 to energize the segment 126. The operators may now release their push-button switches, since the continued operation thereafter depends upon the contacts 44 and 144 of relay CR1 and on the contacts 61 and 161 of the selector switch SS. The operation will now continue until the stop switches are actuated.

Figure 2:
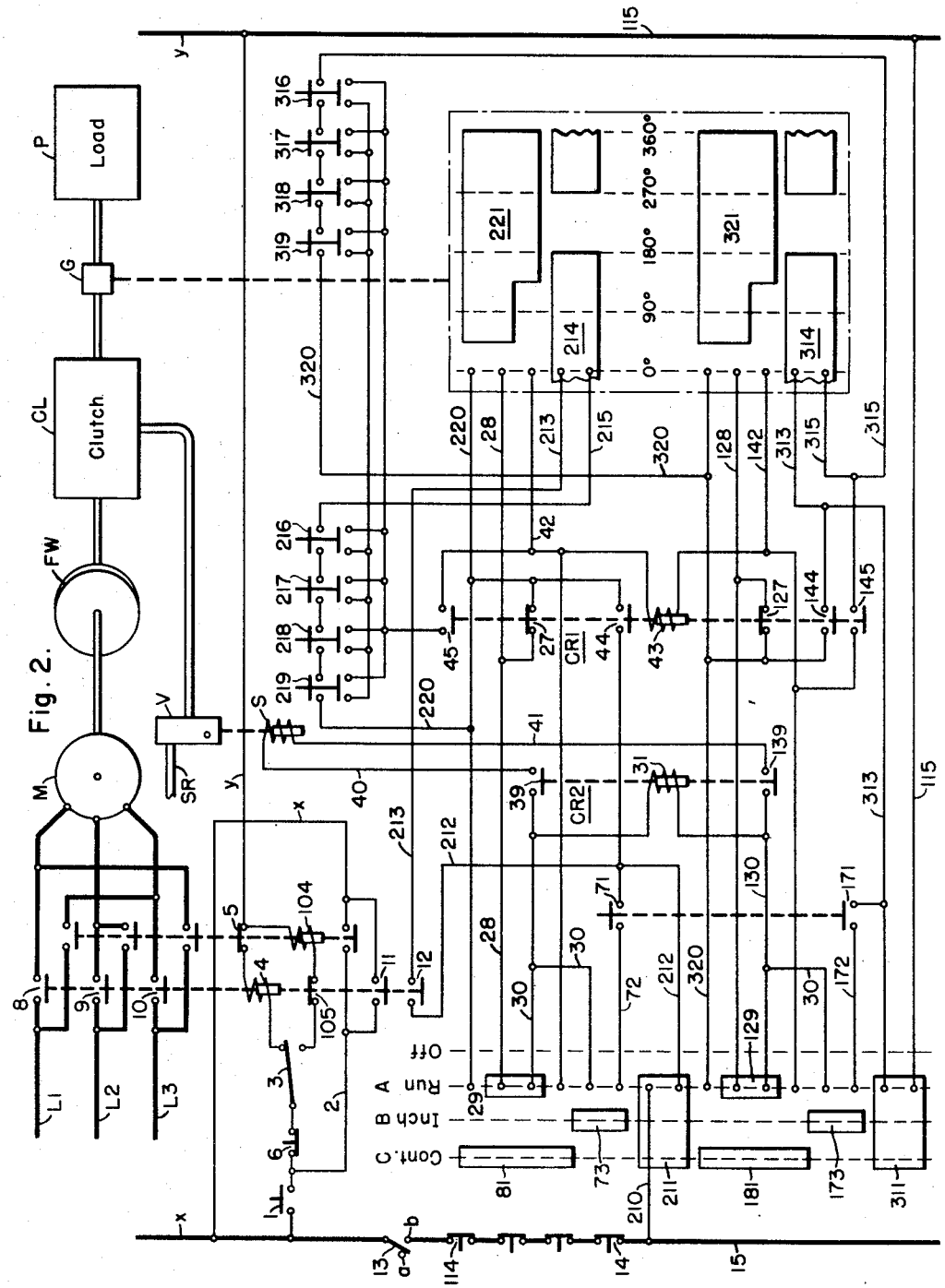
Fig. 2 is a diagrammatic showing of a modification of my invention.

In the modification shown in Fig. 2, like parts are given the same reference characters used in Fig. 1. A repetition of the disclosure with reference to all the elements having reference characters less than 14 need thus not be repeated.

In this modification, if single stroke operation is to be effected, the selected switch will be placed in the Run, or A, position. No circuits will, however, be established prior to operation of the operators push buttons.

When the attendants operate their switches, a circuit is established from conductor 15 through conductor 210, segment 211 of the selector switch SS, conductor 212, normally open contacts 12 of the forward contactor, conductor 213, segment 214 of the limit switch mechanism LS, conductor 215, the normally open or make contacts 216, 217, 218 and 219, conductor 220, normally closed contacts 27 of control relay CR1, conductor 28, segment 29, conductor 30, actuating coil 31 of control relay CR2, conductor 130, segment 129, conductor 128, normally closed contacts 127 of control relay CR1, conductor 320, normally open or make contacts 319, 318, 317, and 316, conductor 315, segment 314, conductor 313, segment 311, to conductor 115.

Since the actuation of coil 31 is directly across energized conductors 30 and 130, this relay CR2 closes its contacts to thus establish an energizing circuit from conductor 30 through normally open contacts 39, conductor 40, solenoid S, conductor 41, normally open contacts 139, to conductor 130. The operation of the valve V thus couples the press P to the motor M, and the press begins its down stroke. The limit switch mechanism LS also starts its rotation. After a rotation of about 60°, segments 221 and 321 engage conductors 28 and 128, respectively, directly. The energization of conductors 30 and 130 and thus solenoid S is thereafter independent of the position of control relay CR1.

After the press has moved the dies down by an amount that the attendants may safely remove their hands from the contacts, which will be at about 135° to 155° of movement, the segment 221 energizes conductor 42 and the segment 321 energizes conductor 142. Since the actuating coil 43 of the control relay CR1 is connected directly across these conductors, this relay CR1 will operate to close normally open contacts 44 and 45, and 144 and 145. The closure of contacts 44 shunts the first group of operators' push buttons. The shunting circuit may be traced from conductor 15 through conductor 210, segment 211, conductor 212, contacts 44 to conductor 220. The closure of contacts 144 shunts the second group of operators' push buttons. This shunting circuit may be traced from conductor 115 through segment 311, conductor 313, and contacts 144 to conductor 320. It is thus apparent that the push-button switches may all be released, and the cycle of operation will be completed.

Another hold-in circuit for the actuating winding 43 may be traced from the energized conductor 212 through contacts 12, conductor 213, segment 214, conductor 215, the lower contacts of the first group of operators' push-button switches, contacts 45 to conductor 42. The other end of this hold-in circuit may be traced from the conductor 142, contacts 145, conductor 315, segment 314, conductor 313, segment 311 to conductor 115. Coil 43 can thus be energized independent of the position of segments 221 and 321.

At about 180° to 220°, the segments 214 and 314 disconnect conductors 213 and 215, and 313 and 315, respectively. If, for any reason, the control relay CR1 has not operated, the solenoid S is deenergized, and the press stops. A check is, thus, made to determine if relay CR1 has operated, which will normally be the case. If the relay has operated, then the operating cycle is completed. At the end of the cycle, segments 221 and 321 are deenergized, but segments 214 and 314 are regenerized. If, for any reason, the operators are still holding their switches in the actuated position, then the relay CR1 remains actuated to hold contacts 27 and 127 open. The cycle can, thus, not repeat except the push buttons are released to permit the relay CR1 to drop out. This antirepeat feature is rather important in press operation.

If inching operation is desired, then the selector switch is moved to the Inch, or B, position, and the inching switches are actuated. The inching circuit may be traced from energized conductor 212 through inching switch 71, conductor 72, segment 73, to conductor 30. The other end of the inching circuit may be traced from conductor 130 through segment 173, conductor 172, inching switch 171 to the energized conductor 313. Relay CR2 thus operates to energize the solenoid S, as long as the inching switches are closed.

For continuous operation, the selector switch is moved to the Cont. position, often designated the "Unsafe Position," since no provision is made for a certain position of the operators.

In the Cont. position, once the press is started through the push buttons and control relay CR1 has actuated, then the energization of the solenoid is independent of the position of the limit switch mechanism. The circuit may be traced from the energized conductor 212 through contacts 44, conductor 220, segment 81 of the selector switch SS to conductor 30. The other end of this circuit may be traced from conductor 130 through segment 181 of the selector switch SS to conductor 320, contacts 144 to the energized conductor 313. Conductors 30 and 130 being, thus, permanently energized, means the solenoid remains energized as long as the selector switch remains in the Cont. position.

While I have here described but one embodiment and one modification of my invention, it is apparent that for those skilled in the art, particularly after having the benefit of the teaching of my invention, there are other modifications that may be devised falling within the spirit and scope of my invention.

I claim as my invention:

1. In an electric system of control for a machine of the type including means for starting and stopping the machine in response to the energization and deenergization of electromagnetic means, in combination, a pair of power supply conductors, a relay having a coil and having one set of contacts, considered normally closed, that are closed only when the contactor is not energized and having two sets of contacts, considered normally open, that are closed only when the relay is energized, an operator's push-button switch having first normally open contacts and second normally open contacts, electromagnetic means, a circuit for connecting said electromagnetic means to said power supply conductors, said circuit including two parallel branches, one branch including the first normally open contacts of the push-button switch and the normally closed contacts of the relay and the other branch including the second normally open contacts of the push-button switch and the normally open contacts of the relay, and circuit means adapted to energize the relay a selected time interval after said operator's push-button switch is operated.

2. In an electric system of control for a machine of the type including means for starting and stopping the machine in response to the energization and deenergization of electromagnetic means, in combination, a pair of power supply conductors, a relay having a coil and having one set of contacts, considered normally closed, that are closed only when the relay is not energized and having two sets of contacts, considered normally open, that are closed only when the relay is energized, and operator's push-button switch having first normally open contacts and second normally open contacts, electromagnetic means, a circuit for connecting said electromagnetic means to said power supply conductors, said circuit including the first normally open contacts of the push-button switch, the normally closed contacts of the relay, and said electromagnetic means, a second circuit for connecting said relay to said terminals, said second circuit including the second normally open contacts of the push-button switch, the normally open contacts of the relay, and the coil of said relay; and control circuit means for connecting said relay coil to said terminals, independent of the normally open contacts of the relay a selected time interval after energization of said electromagnetic means to energize the magnetic contactor.

3. In an electric system of control for a machine of the type comprising means for starting and stopping the machine in response to energization and deenergization of electromagnetic means, in combination, a pair of power supply conductors, electromagnetic means, a plurality of normally open limit switches and a normally closed limit switch, a relay having a coil and having normally closed contacts and first normally open contacts and second normally open contacts, an operator's push-button switch having first normally open contacts and having second normally open contacts, a circuit for connecting said electromagnetic means to said power supply conductors, said circuit including the normally closed limit switch, the first normally open push-button contacts, the normally closed contacts of the relay, and said electro-magnetic means, a control circuit for energizing said relay, said control circuit including the second normally open push-button contacts, a first normally open limit switch, and the coil of said relay; a hold-in circuit for the coil of said relay including the first normally open contacts of the relay, a second normally open limit switch, said first normally open limit switch and said coil of said relay; and means for operating the limit switches to closed positions at selected intervals of time after energization of the electromagnetic means.

4. In an electric system of control for a machine of the type comprising means for starting and stopping the machine in response to energization and deenergization of electromagnetic means, in combination, a pair of power supply conductors, electromagnetic means, a plurality of normally open limit switches and a normally closed limit switch, a relay having a coil and having normally closed contacts and first normally open contacts and second normally open contacts, an operator's push-button switch having first normally open contacts and having second normally open contacts, a circuit for connecting said electromagnetic means to said power supply conductors, said circuit including the normally closed limit switch, the first normally open push-button contacts, the normally closed contacts of the relay, a first conductor, and said electromagnetic means; a control circuit for energizing said relay, said control circuit including the second normally open push-button contacts, a second conductor, a first normally open limit switch, and the coil of said relay; a hold-in circuit for the coil of said relay including the first normally open contacts of the relay, a first normally open limit switch, said second conductor, said first normally open limit switch and the coil of said relay; and means for operating the limit switches to closed positions at selected intervals of time after energization of the electromagnetic means, said second normally open contact of said relay being disposed to connect the first conductor through a third normally open limit switch, to said second conductor.

5. In an electric system of control for a machine of the type comprising means for starting and stopping the machine in response to energization and deenergization of electromagnetic means, in combination, a pair of power supply conductors, electromagnetic means, a plurality of normally open limit switches and a normally closed limit switch, a relay having a coil and having normally closed contacts and first normally open contacts and second normally open contacts, an operator's push-button switch having first normally open contacts and having second normally open contacts, a circuit for connecting said electromagnetic means to said power supply conductors, said circuit including the normally closed limit switch, the first normally open push-button contacts, the normally closed contacts of the relay, a first conductor, and said electromagnetic means; a control circuit for energizing the coil of said relay, said control circuit including the second normally open push-button contacts, a first normally open limit switch, and the coil of said relay; a hold-in circuit for the coil of said relay including the first normally open contacts of the relay, a second normally open limit switch, said first conductor, said first normally open limit switch, and the coil of said relay, and means for operating the limit switches to closed positions at selected intervals of time after energization of the electromagnetic means, said second normally open contacts of said relay being disposed to connect the coil of said relay to the first conductor.

References Cited in the file of this patent
UNITED STATES PATENTS

| | | |
|---|---|---|
| 1,993,413 | Mellon | Mar. 5, 1935 |
| 2,302,838 | Bundy | Nov. 24, 1942 |
| 2,630,467 | Winther | Mar. 3, 1953 |